(12) United States Patent
Rashid et al.

(10) Patent No.: US 10,805,388 B2
(45) Date of Patent: *Oct. 13, 2020

(54) SYSTEM, METHOD, AND COMPUTER PROGRAM FOR ENABLING A USER TO ACCESS AND EDIT VIA A VIRTUAL DRIVE OBJECTS SYNCHRONIZED TO A PLURALITY OF SYNCHRONIZATION CLIENTS

(71) Applicant: Dropbox, Inc., San Francisco, CA (US)

(72) Inventors: Fuad Rashid, Foster City, CA (US); Michael Phillip Morford, San Ramon, CA (US); Eric Wayne Wagner, San Francisco, CA (US); James David Wong, San Jose, CA (US); Sing Yip, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/873,004

(22) Filed: Oct. 1, 2015

(65) Prior Publication Data

US 2016/0028811 A1    Jan. 28, 2016

Related U.S. Application Data

(63) Continuation of application No. 13/571,512, filed on Aug. 10, 2012, now Pat. No. 10,057,318.

(51) Int. Cl.
*G06F 3/048* (2013.01)
*G06F 16/178* (2019.01)
(Continued)

(52) U.S. Cl.
CPC .......... *H04L 67/1095* (2013.01); *G06F 3/048* (2013.01); *H04L 67/00* (2013.01);
(Continued)

(58) Field of Classification Search
CPC . G06F 17/30; G06F 3/048; G06F 3/00; G06F 17/00; G06F 16/10; G06F 16/00;
(Continued)

(56) References Cited

U.S. PATENT DOCUMENTS

| 5,165,031 A | 11/1992 | Pruul et al. |
| 5,862,346 A | 1/1999 | Kley et al. |

(Continued)

OTHER PUBLICATIONS

Ed Rhee, Map a Drive Letter to Google Drive, May 3, 2012, pp. 1-2.*

(Continued)

*Primary Examiner* — Hugo Molina
(74) *Attorney, Agent, or Firm* — Keller Jolley Preece (57) ABSTRACT

A system, method, and computer program for enabling a user to edit and access local and remote objects via a virtual drive, including objects synchronized to a plurality of Synchronization clients. A virtual drive is displayed on the user's local client device with all objects, which a user has synchronized to a synchronization server. A user is able to access and edit any object displayed in the virtual drive. In response to detecting a change in an object in the virtual drive, the object is updated on the synchronization server. All remote clients of the user or of any other users who have access to the changed folder are identified and notified of the change. In response to the change being a change to content within the folder, the content of the folder is automatically updated on any identified remote clients that have a corresponding folder.

24 Claims, 10 Drawing Sheets

(51) Int. Cl.
*G06F 16/27* (2019.01)
*H04L 29/08* (2006.01)
*H04L 29/06* (2006.01)
*G06F 16/00* (2019.01)
*G06F 3/00* (2006.01)

(52) U.S. Cl.
CPC ............ *H04L 67/10* (2013.01); *H04L 67/42* (2013.01); *G06F 3/00* (2013.01); *G06F 16/00* (2019.01)

(58) Field of Classification Search
CPC ........ G06F 16/178; G06F 16/27; G06F 21/00; H04L 67/00; H04L 67/1095
See application file for complete search history.

(56) References Cited

U.S. PATENT DOCUMENTS

| | | | |
|---|---|---|---|
| 6,052,735 | A | 4/2000 | Ulrich et al. |
| 6,125,369 | A | 9/2000 | Wu et al. |
| 6,256,634 | B1 | 7/2001 | Moshaiov et al. |
| 6,260,040 | B1 | 7/2001 | Kauffman et al. |
| 6,272,545 | B1 | 8/2001 | Flanagin et al. |
| 6,348,932 | B1 | 2/2002 | Nishikawa et al. |
| 6,407,750 | B1 | 6/2002 | Gioscia et al. |
| 6,496,979 | B1 | 12/2002 | Chen et al. |
| 6,636,873 | B1 | 10/2003 | Carini et al. |
| 6,636,888 | B1 | 10/2003 | Bookspan et al. |
| 6,725,281 | B1 | 4/2004 | Zintel et al. |
| 6,795,688 | B1 | 9/2004 | Plasson et al. |
| 6,904,185 | B1 | 6/2005 | Wilkins et al. |
| 6,938,076 | B2 | 8/2005 | Meyer et al. |
| 7,039,723 | B2 | 5/2006 | Hu et al. |
| 7,103,357 | B2 | 9/2006 | Kirani et al. |
| 7,139,555 | B2 | 11/2006 | Apfel |
| 7,143,194 | B1 | 11/2006 | Curley et al. |
| 7,162,454 | B1 | 1/2007 | Donner et al. |
| 7,228,352 | B1 | 6/2007 | Yaguchi et al. |
| 7,263,712 | B2 | 8/2007 | Spencer |
| 7,317,699 | B2 | 1/2008 | Godfrey et al. |
| 7,319,536 | B1 | 1/2008 | Wilkins et al. |
| 7,321,919 | B2 | 1/2008 | Jacobs et al. |
| 7,369,161 | B2 | 5/2008 | Earswar et al. |
| 7,372,485 | B1 | 5/2008 | Bodnar et al. |
| 7,421,458 | B1 | 9/2008 | Taylor et al. |
| 7,441,180 | B1 | 10/2008 | Kaczmarek et al. |
| 7,502,795 | B1 | 3/2009 | Svendsen et al. |
| 7,576,752 | B1 | 8/2009 | Benson et al. |
| 7,644,124 | B1 | 1/2010 | Porter |
| 7,680,067 | B2 | 3/2010 | Prasad et al. |
| 7,707,500 | B2 | 4/2010 | Martinez |
| 7,747,596 | B2 | 6/2010 | Bigioi et al. |
| 7,773,106 | B2 | 8/2010 | Serdy, Jr. et al. |
| 7,774,326 | B2 | 8/2010 | Arrouye et al. |
| 7,809,682 | B2 | 10/2010 | Paterson et al. |
| 7,873,353 | B2 | 1/2011 | Kloba et al. |
| 7,885,925 | B1 | 2/2011 | Strong et al. |
| 7,917,628 | B2 | 3/2011 | Hesselink et al. |
| 7,930,270 | B2 | 4/2011 | Tsang |
| 7,962,137 | B2 | 6/2011 | Coppinger et al. |
| 7,962,622 | B2 | 6/2011 | Friend et al. |
| 8,019,900 | B1 | 9/2011 | Sekar et al. |
| 8,230,026 | B2 | 7/2012 | Gilhuly et al. |
| 8,321,374 | B2 | 11/2012 | Holt et al. |
| 8,341,345 | B2 | 12/2012 | Tulskie et al. |
| 8,370,298 | B2 | 2/2013 | Strong et al. |
| 8,600,934 | B2 | 12/2013 | Strong et al. |
| 8,612,439 | B2 | 12/2013 | Prahlad et al. |
| 8,620,861 | B1 | 12/2013 | Uhrhane et al. |
| 8,650,498 | B1 * | 2/2014 | Mihovilovic ........... H04L 41/22 715/763 |
| 8,965,847 | B1 | 2/2015 | Chang |
| 9,037,540 | B2 | 5/2015 | Strong et al. |
| 9,131,054 | B2 | 9/2015 | Vendrow et al. |
| 9,501,762 | B2 | 11/2016 | Babenko et al. |
| 9,817,878 | B2 | 11/2017 | Newhouse |
| 10,057,318 | B1 | 8/2018 | Rashid et al. |
| 10,320,904 | B2 | 6/2019 | Strong et al. |
| 2002/0013852 | A1 | 1/2002 | Janik |
| 2002/0044159 | A1 | 4/2002 | Kuroiwa et al. |
| 2002/0059604 | A1 | 5/2002 | Papagan et al. |
| 2002/0065848 | A1 | 5/2002 | Walker et al. |
| 2002/0066050 | A1 | 5/2002 | Lerman et al. |
| 2002/0099772 | A1 | 7/2002 | Deshpande et al. |
| 2002/0129096 | A1 | 9/2002 | Mansour et al. |
| 2002/0184264 | A1 | 12/2002 | Berg et al. |
| 2003/0004952 | A1 | 1/2003 | Nixon et al. |
| 2003/0014478 | A1 | 1/2003 | Noble |
| 2003/0037114 | A1 | 2/2003 | Nishio et al. |
| 2003/0041094 | A1 | 2/2003 | Lara et al. |
| 2003/0055825 | A1 | 3/2003 | Chen et al. |
| 2003/0058277 | A1 | 3/2003 | Bowman-Amuah |
| 2003/0074418 | A1 | 4/2003 | Coker |
| 2003/0097361 | A1 | 5/2003 | Huang et al. |
| 2003/0131098 | A1 | 7/2003 | Huntington et al. |
| 2003/0159136 | A1 | 8/2003 | Huang et al. |
| 2003/0172127 | A1 | 9/2003 | Northrup et al. |
| 2003/0218633 | A1 | 11/2003 | Mikhail et al. |
| 2004/0024979 | A1 | 2/2004 | Kaminsky et al. |
| 2004/0044732 | A1 | 3/2004 | Fushiki et al. |
| 2004/0054736 | A1 | 3/2004 | Daniell et al. |
| 2004/0068524 | A1 | 4/2004 | Aboulhosn et al. |
| 2004/0088420 | A1 | 5/2004 | Allen et al. |
| 2004/0107236 | A1 | 6/2004 | Nakagawa et al. |
| 2004/0123048 | A1 | 6/2004 | Mullins et al. |
| 2004/0126750 | A1 | 7/2004 | Theilmann et al. |
| 2004/0148207 | A1 | 7/2004 | Smith et al. |
| 2004/0148375 | A1 | 7/2004 | Levett et al. |
| 2004/0172423 | A1 * | 9/2004 | Kaasten ............ G06F 17/30176 |
| 2004/0267905 | A1 | 12/2004 | McDonough et al. |
| 2004/0268364 | A1 | 12/2004 | Faraj |
| 2005/0015441 | A1 | 1/2005 | Attwood et al. |
| 2005/0038863 | A1 | 2/2005 | Onyon et al. |
| 2005/0044164 | A1 | 2/2005 | O'Farrell et al. |
| 2005/0044165 | A1 | 2/2005 | O'Farrell et al. |
| 2005/0091595 | A1 | 4/2005 | Shappell |
| 2005/0149481 | A1 | 7/2005 | Hesselink et al. |
| 2005/0149508 | A1 * | 7/2005 | Deshpande ........ G06F 17/30091 |
| 2005/0165869 | A1 | 7/2005 | Huang et al. |
| 2005/0198015 | A1 | 9/2005 | Sezan et al. |
| 2005/0208803 | A1 | 9/2005 | Rohatgi et al. |
| 2005/0223061 | A1 | 10/2005 | Auerbach et al. |
| 2005/0246373 | A1 | 11/2005 | Faulkner et al. |
| 2005/0246374 | A1 | 11/2005 | Blinn et al. |
| 2005/0278458 | A1 | 12/2005 | Berger et al. |
| 2006/0018444 | A1 | 1/2006 | Pantana et al. |
| 2006/0052091 | A1 | 3/2006 | Onyon et al. |
| 2006/0085429 | A1 | 4/2006 | Wener et al. |
| 2006/0101053 | A1 * | 5/2006 | Proctor ............... G06F 9/44505 |
| 2006/0101064 | A1 | 5/2006 | Strong et al. |
| 2006/0123010 | A1 | 6/2006 | Landry et al. |
| 2006/0156239 | A1 | 7/2006 | Jobs et al. |
| 2006/0168000 | A1 | 7/2006 | Bodlaender |
| 2006/0170669 | A1 | 8/2006 | Walker et al. |
| 2006/0184673 | A1 | 8/2006 | Liebman |
| 2006/0242206 | A1 | 10/2006 | Brezak et al. |
| 2006/0259957 | A1 | 11/2006 | Tam |
| 2007/0005581 | A1 | 1/2007 | Arrouye et al. |
| 2007/0005707 | A1 | 1/2007 | Teodosiu et al. |
| 2007/0016695 | A1 | 1/2007 | Rabbers et al. |
| 2007/0043830 | A1 | 2/2007 | Housenbold et al. |
| 2007/0078938 | A1 * | 4/2007 | Hu .......................... H04L 51/08 709/206 |
| 2007/0156434 | A1 | 7/2007 | Martin et al. |
| 2007/0179989 | A1 | 8/2007 | Maes |
| 2007/0180075 | A1 | 8/2007 | Chasman et al. |
| 2007/0180084 | A1 | 8/2007 | Mohanty |
| 2007/0198473 | A1 | 8/2007 | Carrier |
| 2007/0209005 | A1 | 9/2007 | Shaver et al. |
| 2007/0239898 | A1 | 10/2007 | Friend et al. |
| 2007/0250645 | A1 | 10/2007 | Meadows et al. |
| 2007/0276836 | A1 | 11/2007 | Chatterjee et al. |
| 2007/0288614 | A1 * | 12/2007 | May ..................... G06F 16/273 709/223 |

(56) References Cited

U.S. PATENT DOCUMENTS

| | | | |
|---|---|---|---|
| 2007/0294366 A1* | 12/2007 | Ozzie | G06F 17/30578 709/217 |
| 2008/0109448 A1 | 5/2008 | Aboel-Nil et al. | |
| 2008/0126936 A1 | 5/2008 | Williams | |
| 2008/0140732 A1 | 6/2008 | Wilson | |
| 2008/0168185 A1 | 7/2008 | Robbin et al. | |
| 2008/0184125 A1 | 7/2008 | Suleiman et al. | |
| 2008/0189627 A1* | 8/2008 | Nikitin | G06F 3/0481 715/762 |
| 2008/0195729 A1* | 8/2008 | Chand | H04L 29/06 709/224 |
| 2008/0195739 A1 | 8/2008 | Ozzie et al. | |
| 2008/0208870 A1 | 8/2008 | Tsang | |
| 2008/0208998 A1 | 8/2008 | Warren et al. | |
| 2008/0250083 A1* | 10/2008 | Kovacs | G06F 9/44505 |
| 2008/0307504 A1 | 12/2008 | Cisler | |
| 2009/0024931 A1* | 1/2009 | Bae | G06F 16/176 715/748 |
| 2009/0064284 A1* | 3/2009 | Poston | G06F 21/10 726/4 |
| 2009/0094252 A1 | 4/2009 | Wong et al. | |
| 2009/0183060 A1 | 7/2009 | Heller et al. | |
| 2009/0187609 A1 | 7/2009 | Barton et al. | |
| 2009/0300020 A1* | 12/2009 | Chen | G06F 21/6218 |
| 2009/0327900 A1* | 12/2009 | Noll | G06F 9/468 715/733 |
| 2010/0063670 A1 | 3/2010 | Brzezinski et al. | |
| 2010/0115614 A1 | 5/2010 | Barile et al. | |
| 2010/0205196 A1 | 8/2010 | Schreiber | |
| 2010/0241980 A1* | 9/2010 | Sosnosky | G06F 3/0486 715/769 |
| 2010/0332682 A1* | 12/2010 | Sharp | G06Q 10/00 709/248 |
| 2011/0010332 A1 | 1/2011 | Vasudevan | |
| 2011/0106880 A1 | 5/2011 | Strong et al. | |
| 2012/0016915 A1 | 1/2012 | Choi et al. | |
| 2012/0084355 A1 | 4/2012 | Locker et al. | |
| 2012/0096389 A1* | 4/2012 | Flam | G06F 16/168 715/777 |
| 2012/0197862 A1 | 8/2012 | Woytowitz et al. | |
| 2013/0007207 A1* | 1/2013 | Dietrich | G06F 16/183 709/217 |
| 2013/0066975 A1 | 3/2013 | Kantor et al. | |
| 2013/0067594 A1* | 3/2013 | Kantor | H04L 67/306 726/28 |
| 2013/0091550 A1 | 4/2013 | Joyce et al. | |
| 2013/0110903 A1* | 5/2013 | Myerscough | H04L 67/06 709/203 |
| 2013/0117423 A1 | 5/2013 | Gupta et al. | |
| 2013/0198868 A1 | 8/2013 | Georgiev | |
| 2013/0205251 A1* | 8/2013 | Cisler | G06F 17/30126 715/810 |
| 2013/0212486 A1* | 8/2013 | Joshi | H04W 4/02 715/744 |
| 2013/0232187 A1 | 9/2013 | Workman et al. | |
| 2013/0275509 A1* | 10/2013 | Micucci | H04L 67/02 709/204 |
| 2013/0282830 A1 | 10/2013 | Besen et al. | |
| 2013/0305039 A1 | 11/2013 | Gauda | |
| 2013/0311598 A1 | 11/2013 | Arrouye et al. | |
| 2013/0311986 A1 | 11/2013 | Arrouye et al. | |
| 2013/0318582 A1* | 11/2013 | McCann | G06F 21/41 726/7 |
| 2014/0095457 A1 | 4/2014 | Quan et al. | |
| 2014/0181016 A1 | 6/2014 | Whitehead et al. | |
| 2015/0213101 A1 | 7/2015 | Strong et al. | |
| 2015/0264115 A1 | 9/2015 | Reilly et al. | |
| 2016/0026704 A1 | 1/2016 | Strong et al. | |
| 2016/0028809 A1 | 1/2016 | Strong et al. | |
| 2016/0028810 A1 | 1/2016 | Strong et al. | |
| 2016/0028812 A1 | 1/2016 | Strong et al. | |
| 2016/0028813 A1 | 1/2016 | Strong et al. | |
| 2016/0028814 A1 | 1/2016 | Strong et al. | |
| 2016/0028815 A1 | 1/2016 | Strong et al. | |
| 2016/0028852 A1 | 1/2016 | Strong et al. | |
| 2016/0055171 A1 | 2/2016 | Araki et al. | |
| 2018/0278684 A1 | 9/2018 | Rashid et al. | |

OTHER PUBLICATIONS

Rhee, E., "How to map a drive letter to Google Drive in Windows," pp. 1-2, May 3, 2012.

Jmans25, Map/Mount Dropbox as a network drive, Oct. 14, 2011, Youtube, p. 1.

U.S. Appl. No. 13/571,512, filed Feb. 24, 2014, Office Action.
U.S. Appl. No. 13/571,512, filed Jun. 13, 2014, Office Action.
U.S. Appl. No. 13/571,512, filed Sep. 23, 2014, Office Action.
U.S. Appl. No. 13/571,512, filed Apr. 23, 2015, Office Action.
U.S. Appl. No. 13/571,512, filed May 19, 2016, Office Action.
U.S. Appl. No. 13/571,512, filed Oct. 20, 2016, Office Action.
U.S. Appl. No. 13/571,512, filed Oct. 26, 2017, Office Action.
U.S. Appl. No. 13/571,512, filed Apr. 6, 2018, Notice of Allowance.
U.S. Appl. No. 15/992,342, filed Jul. 31, 2019, Office Action.
Final Office Action from U.S. Appl. No. 15/992,342, filed Feb. 25, 2020, 19 pages.
Advisory Action from U.S. Appl. No. 15/992,342, dated May 19, 2020, 3 pages.
Deshpande M., et al., "Item-Based Top-N Recommendation Algorithms," ACM Transactions on Information Systems, vol. 22, No. 1, Jan. 2004, pp. 143-177.
Non-Final Office Action from U.S. Appl. No. 14/873,187, dated Jan. 10, 2020, 17 pages.
Notice of Allowance from U.S. Appl. No. 14/873,187, dated Jun. 24, 2020, 13 pages.
Notice of Allowance from U.S. Appl. No. 15/992,342, dated Jun. 15, 2020, 10 pages.
Notice of Allowance for U.S. Appl. No. 12/157,772 dated Oct. 6, 2010, 15 pages.
Notice of Allowance for U.S. Appl. No. 12/928,998 dated Oct. 9, 2012, 13 pages.
Notice of Allowance for U.S. Appl. No. 13/757,024 dated Jul. 25, 2013, 11 pages.
Notice of Allowance for U.S. Appl. No. 13/757,024 dated Oct. 30, 2013, 7 pages.
Notice of Allowance for U.S. Appl. No. 14/075,598 dated Jan. 14, 2015, 10 pages.
Notice of Allowance for U.S. Appl. No. 14/683,341 dated Jun. 25, 2018, 10 pages.
Notice of Allowance for U.S. Appl. No. 14/873,199 dated Jan. 25, 2019, 16 pages.
Notice of Allowance for U.S. Appl. No. 14/873,197 dated Aug. 29, 2019, 14 pages.
Office Action for U.S. Appl. No. 14/873,187 dated Apr. 24, 2019, 21 pages.
Office Action for U.S. Appl. No. 11/269,498 dated Aug. 22, 2007, 18 pages.
Office Action for U.S. Appl. No. 11/269,498 dated Mar. 25, 2008, 17 pages.
Office Action for U.S. Appl. No. 11/269,498 dated Mar. 7, 2007, 14 pages.
Office Action for U.S. Appl. No. 12/928,998 dated Apr. 22, 2011, 26 pages.
Office Action for U.S. Appl. No. 12/928,998 dated Nov. 23, 2011, 24 pages.
Office Action for U.S. Appl. No. 14/683,341 dated Nov. 16, 2017, 14 pages.
Office Action for U.S. Appl. No. 14/872,004 dated Jan. 18, 2018, 8 pages.
Office Action for U.S. Appl. No. 14/872,004 dated Mar. 28, 2019, 19 pages.
Office Action for U.S. Appl. No. 14/872,004 dated Sep. 6, 2018, 11 pages.
Office Action for U.S. Appl. No. 14/872,019 dated Aug. 29, 2018, 13 pages.

(56) References Cited

OTHER PUBLICATIONS

Office Action for U.S. Appl. No. 14/872,019 dated Feb. 26, 2019, 15 pages.
Office Action for U.S. Appl. No. 14/872,019 dated Nov. 16, 2017, 14 pages.
Office Action for U.S. Appl. No. 14/872,943 dated Jul. 11, 2018, 12 pages.
Office Action for U.S. Appl. No. 14/872,943 dated Oct. 4, 2017, 13 pages.
Office Action for U.S. Appl. No. 14/872,943 dated Dec. 19, 2018, 19 pages.
Office Action for U.S. Appl. No. 14/873,186 dated Mar. 22, 2018, 24 pages.
Office Action for U.S. Appl. No. 14/873,186 dated Dec. 13, 2018, 33 pages.
Office Action for U.S. Appl. No. 14/873,187 dated Apr. 17, 2018, 15 pages.
Office Action for U.S. Appl. No. 14/873,187 dated Dec. 10, 2018, 18 pages.
Office Action for U.S. Appl. No. 14/873,195 dated Apr. 19, 2018, 14 pages.
Office Action for U.S. Appl. No. 14/873,197 dated Jul. 11, 2018, 13 pages.
Office Action for U.S. Appl. No. 14/873,197 dated Jun. 3, 2019, 20 pages.
Office Action for U.S. Appl. No. 14/873,197 dated Oct. 5, 2017, 13 pages.
Office Action for U.S. Appl. No. 14/873,197 dated Dec. 14, 2018, 16 pages.
Office Action for U.S. Appl. No. 14/873,199 dated Jun. 1, 2018, 16 pages.
Office Action for U.S. Appl. No. 14/872,943 dated Jun. 17, 2019, 19 pages.
Srinet K., et al., "10-605-HW 5—Distributed SGD for Matrix Factorization on Spark," Carnegie Mellon University, Pittsburgh, PA, Nov. 12, 2015, pp. 1-11.
Non-Final Office Action from U.S. Appl. No. 15/964,267, dated Jul. 27, 2020, 21 pages.
Non-Final Office Action from U.S. Appl. No. 16/397,945, dated Jul. 23, 2020, 18 pages.
Notice of Allowance from U.S. Appl. No. 14/873,187, dated Jul. 30, 2020, 8 pages.

\* cited by examiner

```
┌─────────────────────────────────────────────────────────────────────────┐
│ Enable a user to synchronize a folder using a synchronization client, a │
│          synchronization server, and other synchronization clients.     │
│                                    105                                  │
└─────────────────────────────────────────────────────────────────────────┘
                                     │
                                     ▼
┌─────────────────────────────────────────────────────────────────────────┐
│  Identify all folders, across a plurality of synchronization clients,   │
│       that a user has synchronized to the synchronization server.       │
│                                    110                                  │
└─────────────────────────────────────────────────────────────────────────┘
                                     │
                                     ▼
┌─────────────────────────────────────────────────────────────────────────┐
│ Display a virtual drive on the user's local client device with the      │
│ identified folders. The virtual drive appears as a separate disk drive  │
│ on the user's local client device. The virtual drive includes all of    │
│ the user's synced folders, regardless of whether they reside on a local │
│ client or a remote client.                                              │
│                                    115                                  │
└─────────────────────────────────────────────────────────────────────────┘
                                     │
                                     ▼
┌─────────────────────────────────────────────────────────────────────────┐
│ Enable a user to access and edit any item within any folder displayed   │
│ in the virtual drive, including folders that do not reside on the local │
│ client.                                                                 │
│                                    120                                  │
└─────────────────────────────────────────────────────────────────────────┘
                                     │
                                     ▼
                                  ( A )
```

Enable a user to create a collection that comprises items across a plurality of synchronization clients that share one or more specified attributes, regardless of the folder(s) in which the items reside.
140

Display the collection in the virtual drive.
145

Enable a user to access and edit items within the collection.
150

```
┌─────────────────────────────────────────────────────────────────┐
│ Virtual drive on Elisabeth's Client Devices (A, B, C) display   │
│ Folders #1-7. Virtual drive on Andrew's Client Device D         │
│ displays Folders #5 (shared), 8, and 9.                         │
│                            405                                   │
└─────────────────────────────────────────────────────────────────┘
                                │
                                ▼
┌─────────────────────────────────────────────────────────────────┐
│ Elisabeth double clicks on a file in Folder #5 via virtual      │
│ drive on Client Device A. Client Device A requests the file     │
│ from the synchronization server.                                │
│                            410                                   │
└─────────────────────────────────────────────────────────────────┘
                                │
                                ▼
┌─────────────────────────────────────────────────────────────────┐
│ Synchronization server sends Client Device A copy of selected   │
│ file                                                             │
│                            420                                   │
└─────────────────────────────────────────────────────────────────┘
                                │
                                ▼
┌─────────────────────────────────────────────────────────────────┐
│ Elisabeth changes the file on Client Device A                   │
│                            425                                   │
└─────────────────────────────────────────────────────────────────┘
                                │
                                ▼
┌─────────────────────────────────────────────────────────────────┐
│ Local sync client on Client Device A detects change and         │
│ notifies Synchronization Server. Local sync client also         │
│ updates local sync metadata on Client Device A to reflect       │
│ change.                                                          │
│                            430                                   │
└─────────────────────────────────────────────────────────────────┘
                                │
                                ▼
┌─────────────────────────────────────────────────────────────────┐
│ Synchronization Server obtains relevant file data from Client   │
│ Device A and updates its copy of Folder #5 in the Sync Database │
│                            435                                   │
└─────────────────────────────────────────────────────────────────┘
                                │
                                ▼
                             (  A  )
```

SYSTEM, METHOD, AND COMPUTER PROGRAM FOR ENABLING A USER TO ACCESS AND EDIT VIA A VIRTUAL DRIVE OBJECTS SYNCHRONIZED TO A PLURALITY OF SYNCHRONIZATION CLIENTS

CROSS-REFERENCE TO RELATED APPLICATIONS

This application is a continuation of application Ser. No. 13/571,512 entitled "SYSTEM, METHOD, AND COMPUTER PROGRAM FOR ENABLING A USER TO ACCESS AND EDIT VIA A VIRTUAL DRIVE OBJECTS SYNCHRONIZED TO A PLURALITY OF SYNCHRONIZATION CLIENTS" and filed on Aug. 10, 2012, which is expressly incorporated by reference herein in its entirety.

BACKGROUND OF THE INVENTION

1. Field of the Invention

This invention relates generally to a synchronization system and, more particularly, to a system and method for enabling a user to access and edit, via a virtual drive, objects synchronized to a plurality of synchronization clients.

2. Description of the Background Art

Many users have multiple computing devices, such as a home computer, a work computer, and a mobile phone. Different files may be stored by synchronization software clients on different devices. Virtual drives enable a user to back up files on a computer to a server and have remote access to tiles stored on the server, presented as though the files exist on a locally mounted file system. However, in a synchronization system, a user may have synchronized an object to multiple clients, and known virtual drives do not enable a user to make a change to a remote tile and then have that change automatically synchronized across multiple clients. As an example, User A has a folder that resides on his work and home computer. User A has also shared that folder with User B. User A desires not only to be able to remotely access the folder from another synchronization software client via a virtual drive, but also to have any changes made to the folder via the virtual drive automatically synchronized to his home and work computer, as well as any client devices of User B that have a corresponding copy of the folder. Therefore, there is a need for a system and method for enabling a user to access and edit via a virtual drive objects synchronized to a plurality of synchronization clients.

SUMMARY OF THE INVENTION

The present invention is directed to a synchronization system, method, and computer program for enabling a user to access and edit, via a virtual drive, local and remote objects, including objects synchronized to a plurality of synchronization software, clients. The present invention enables a user to make a change to an object via a virtual drive and have that change automatically synchronized to a plurality of synchronization clients.

The method includes enabling a user to synchronize one or more objects using a synchronization software client, a synchronization server, and other synchronization clients. Objects may be folders, music files, video files, images, contacts, calendar items, and other types of electronic files or items. All objects, across a plurality of synchronization clients that a user has synchronized to the synchronization server, are identified. A virtual drive is displayed on the user's local client device with the identified objects. The virtual drive appears as a separate disk drive on the user's local client device and includes objects that reside on one or more remote clients. A user is able to access and edit any object displayed in the virtual drive, including objects that reside only on remote clients. In response to detecting a change in an object in the virtual drive, the object is updated on the synchronization server. All remote synchronization clients of the user are identified in the synchronization system, as well as all remote synchronization clients, if any, of other users whom have access to the changed object. The identified synchronization clients are notified of the change to the object. In response to the change being a change to content within the object, the content of the object is automatically updated on any identified remote clients that have a corresponding object.

In certain embodiments, a user is able to create a collection that comprises items across a plurality of synchronization clients that share one or more specified attributes, regardless of the folder(s) in which the items reside. The collection is displayed in the virtual drive. A user is able to access and edit items within the collection. In response to a user editing an item within a collection, a folder is identified m which the item resides. The folder is updated, on the synchronization server with the edit to the item. AH remote synchronization clients of the user in the synchronization system are identified, as well as all remote synchronization software clients, if any, of other users whom have access to the changed folder. The identified clients are notified of the change to the folder. In response to the change being a change to content within the folder, the content of the folder is automatically updated on any identified remote clients that have a corresponding folder. In certain embodiments, the items in the collection are not limited to files organized within folders on a file system, but are arbitrary objects existing within an arbitrary organizational scheme.

The attributes may be specified by the user, other software programs, or the synchronization system. The attributes may include one or more of the following: location associated with the file, version of the file, a time stamp associated with the file, client device on which the file resides, and the file type. The attributes may include a permission class associated with the shared files.

In one embodiment the user is able to perform share and synchronization functions via the virtual drive. The folders in the virtual drive may be organized by client device or may be client device-independent.

DETAILED DESCRIPTION OF THE PREFERRED EMBODIMENTS

The present invention provides a system, method, and computer program for enabling a user to access and edit, via a virtual drive, local and remote objects in a synchronization system, including objects synchronized to a plurality of synchronization software clients. Examples of synchronization Systems are disclosed in (i) U.S. Pat. No. 7,885,925, titled "Method and Apparatus for File Sharing and Synchronization System" and (ii) U.S. Pat. No. 8,019,900, titled "Opportunistic Peer to Peer Synchronization in a Synchronization System." The contents of both of these patents are incorporated herein by reference as if fully disclosed herein. A person skilled in the art would understand that other synchronization systems may be used within the scope of the present invention.

As used herein, a virtual drive is a file system representation on the user's local client device, of data from a source that is external to the local file system. In the present invention, the virtual drive provides a file system representation, on the user's local client device, of all objects, across a plurality of clients—including the local client, which a user has synchronized or otherwise saved to the synchronization system. In the preferred embodiment, a local sync database stores metadata about these objects, and this metadata is used to generate the virtual drive. As used herein, metadata is a collection of attributes that describe the state of an object and is used by the synchronization system to detect and orchestrate changes to the object.

As used herein, an object may be a folder, a file (e.g., a WORD document, an EXCEL spreadsheet, a POWERPOINT presentation, an email, contact, or calendar item, such as in MICROSOFT OUTLOOK), a media object (e.g., a video file, an audio or music file, an image file), or a collection. A person skilled in the art would understand that objects are not limited to the above-specified examples.

As used herein, a collection includes, items, across a plurality of synchronization software clients, which share one or more specified attributes. An attribute is a property that the user can assign to any object or collection (e.g., client name). An attribute has an attribute value (i.e., the value that a user might assign to an attribute) and an attribute type (i.e., the data type of the attribute value). One example of a collection may be the user's recent photographs from Hawaii that are stored across the user's camera, mobile device, laptop, and home computer. Attributes may be specified automatically by the synchronization system, by another software program, or by the user. Types of attributes available for specification by the user include (i) permission class associated with a shared object, (ii) a file type associate with a file, (iii) a location associated with an object, (iv) version of the file, (v) time stamp associated with the file, (vi) client device on which the file resides, and (vii) an arbitrary attribute type defined by the user or other software program. A person skilled in the art would understand that other attributes may be assigned within the scope of the present invention.

Figure 1A:
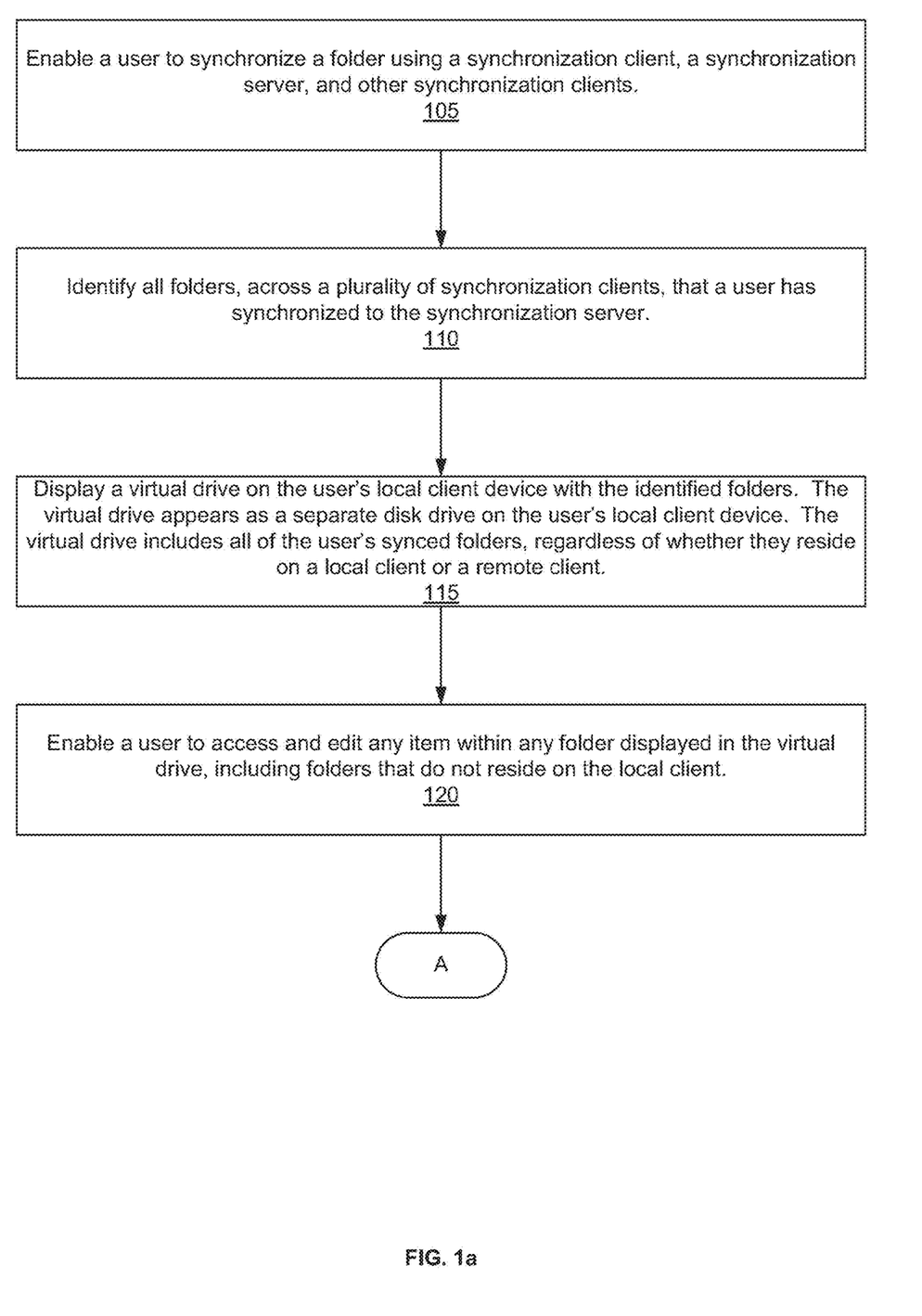
FIGS. 1a-1b are a flowchart that illustrates a method, according to one embodiment of the invention, for enabling a user to access and edit, via a virtual drive, local and remote objects, including objects synchronized to a plurality of synchronization software clients.
Figure 1B:
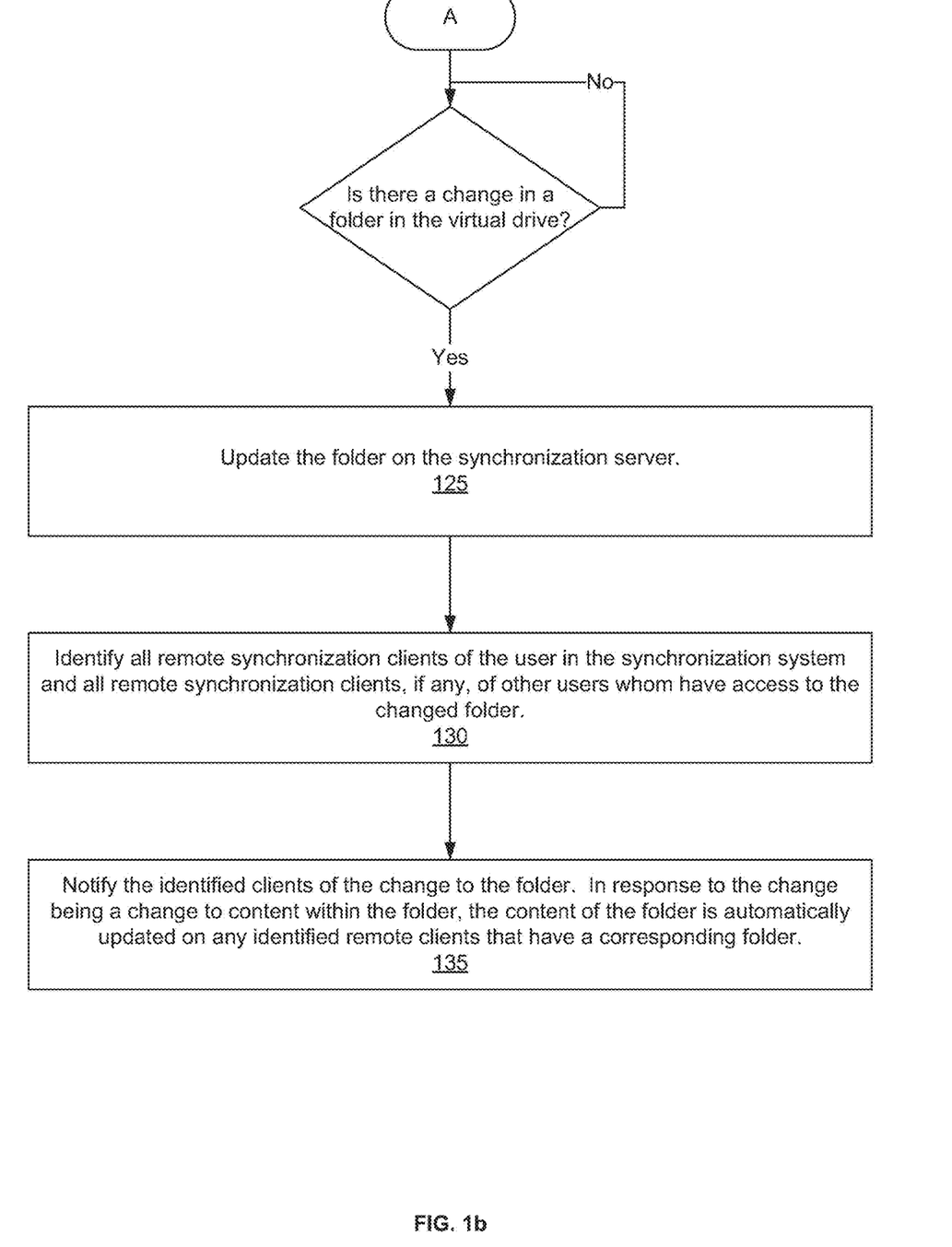

FIGS. 1a-1b illustrate a method, according to one embodiment, for enabling a user to access and edit, via a virtual drive, local and remote objects in a synchronization system, including objects synchronized to a plurality of synchronization clients. In the preferred embodiment, the objects are folders that may contain documents (e.g., EXCEL, POWERPOINT, or WORD documents), email/calendar items, video files, and/or photos, but those skilled in the art will appreciate that the method of the present invention may be applied to other objects.

Referring to FIG. 1a, a user is enabled to synchronize one or more folders on any synchronization client to the synchronization server and other synchronization clients (step 105). All folders, across a plurality of synchronization clients that a user has backed up or synchronized to the synchronization server, are identified, as well as any folders that the user shares with other users (step 110). Each of the synchronization clients stores metadata with information on all folders shared with or by the user and all folders that the user has backed up or synced to the synchronization server (including the contents of the folder). The synchronization client on the client device uses this metadata to generate the virtual drive and the user interface.

A virtual drive is displayed on the user's local client device with the identified folders (step 115). The virtual drive appears as a separate disk drive on the user's local client device. The virtual drive includes all of the user's synced folders, regardless of whether a folder resides on the local client or only on a remote client. A user is enabled to access and edit any item within any folder displayed in the virtual drive, including folders that do not reside on the local client (step 120). In one embodiment, when a user double clicks on a file or item in a remote folder in the virtual drive, the server downloads its copy of the file/item to the local synchronization software client (i.e., the client currently being used by the user). The user can then edit the file/item as desired. In one embodiment, when a user double clicks on a local folder, the user is taken to the folder in the local file system view. In another embodiment, the server downloads its copy of the item/file in the local computer.

In response to detecting a change in a folder in the virtual drive, the folder is updated on the synchronization server (step 125). All remote clients of the user in the synchronization system are identified, as well as all remote synchronization clients if any, of other users whom have access to the changed folder (step 130). In one embodiment, all synchronization clients that have an interest in updates to the folder "register" for notices of changes to the folder. The identified clients are notified of the change to the folder (step 135). In response to the change being a change to content within the folder, the content of the folder is automatically updated on any identified remote clients that have a corresponding folder. In one embodiment, the synchronization server first sends metadata to all the identified clients, notifying them of the change. The synchronization clients that have their own copy of the changed folder will then request the applicable file data from the server and the server will download the requested file data to the requesting synchronization clients.

Figure 1C:
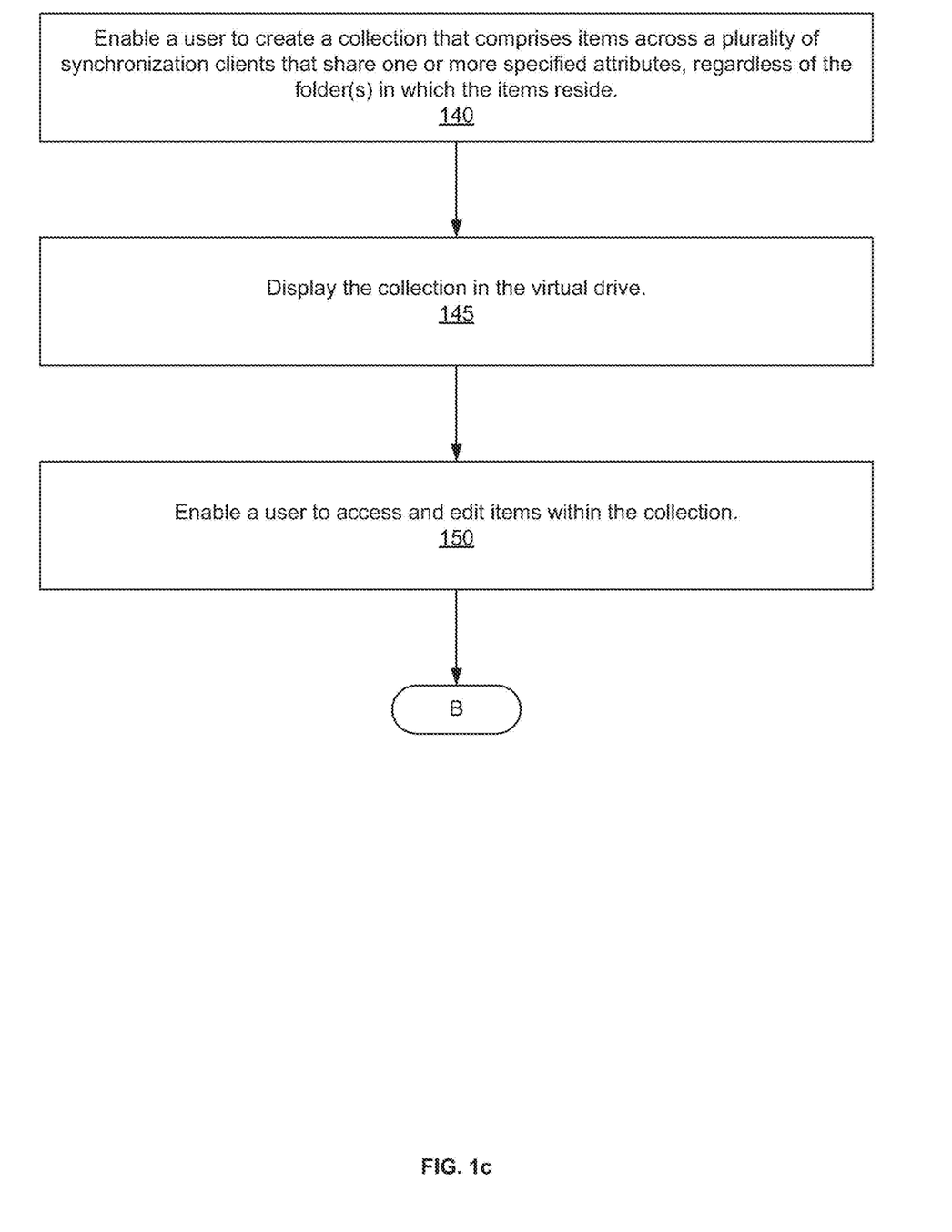
FIGS. 1c-1d are a flowchart that illustrates a further embodiment of the invention in which a user is able to view, access, and synchronize collections via a virtual drive.
Figure 1D:
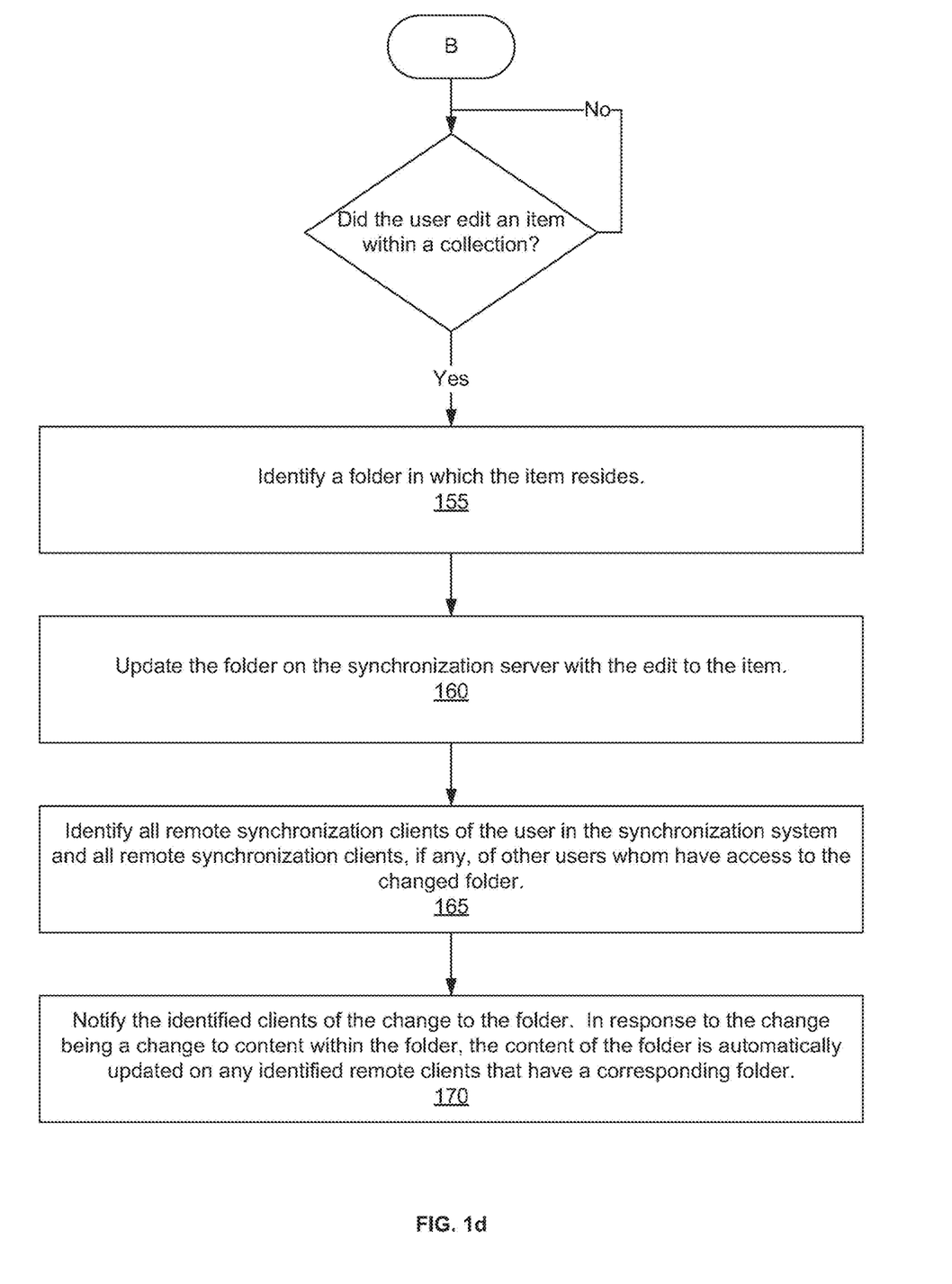

FIGS. 1c-1d illustrate a further embodiment of the invention. In this embodiment, a user is enabled to create a collection that comprises items across a plurality of synchronization clients that share one or more specified attributes, regardless of the folder(s) in which the items reside (step 140). In certain embodiments, the collections and items within collections are not limited to files organized within folders on a file system, but are arbitrary objects existing within an arbitrary organizational scheme within an arbitrary data set.

The collection is displayed in the virtual drive (step 145). The collection may be displayed in the virtual drive as a folder, as a file, or as an object, (e.g., a node). A user is enabled to access and edit items within the collection (step 150). In response to a user editing an item within a collection, a folder is identified in which the item resides (step 155). The folder is updated on the synchronization server with the edit to the item (step 160). All remote clients of the user in the synchronization system and all remote synchronization clients, if any, of other users whom have access to the changed folder are identified (step 165). The identified clients are notified of the change to the folder (step 170). In response to the change being a change to content within the folder, the content of the folder is automatically updated on any identified remote clients that have a corresponding folder. In the case where the items in the collection reside across an alternate organizational scheme (other than a file or folder system), the identified clients are notified of changes to any item. In response to the change being a change to content within the original physical or logical location, the content of the item is automatically updated on any identified remote clients that have a corresponding representation of the item.

The virtual drive may be organized by client device or may be client device-independent. A user may be able to perform share and synchronization management functions via the virtual drive. For example, a user may be able to right click on an object in the virtual drive to take a specific sham action (e.g., share an object with another user or change the permission settings for another user with respect to the object) or alter the synchronization settings for the folder.

Figure 2:
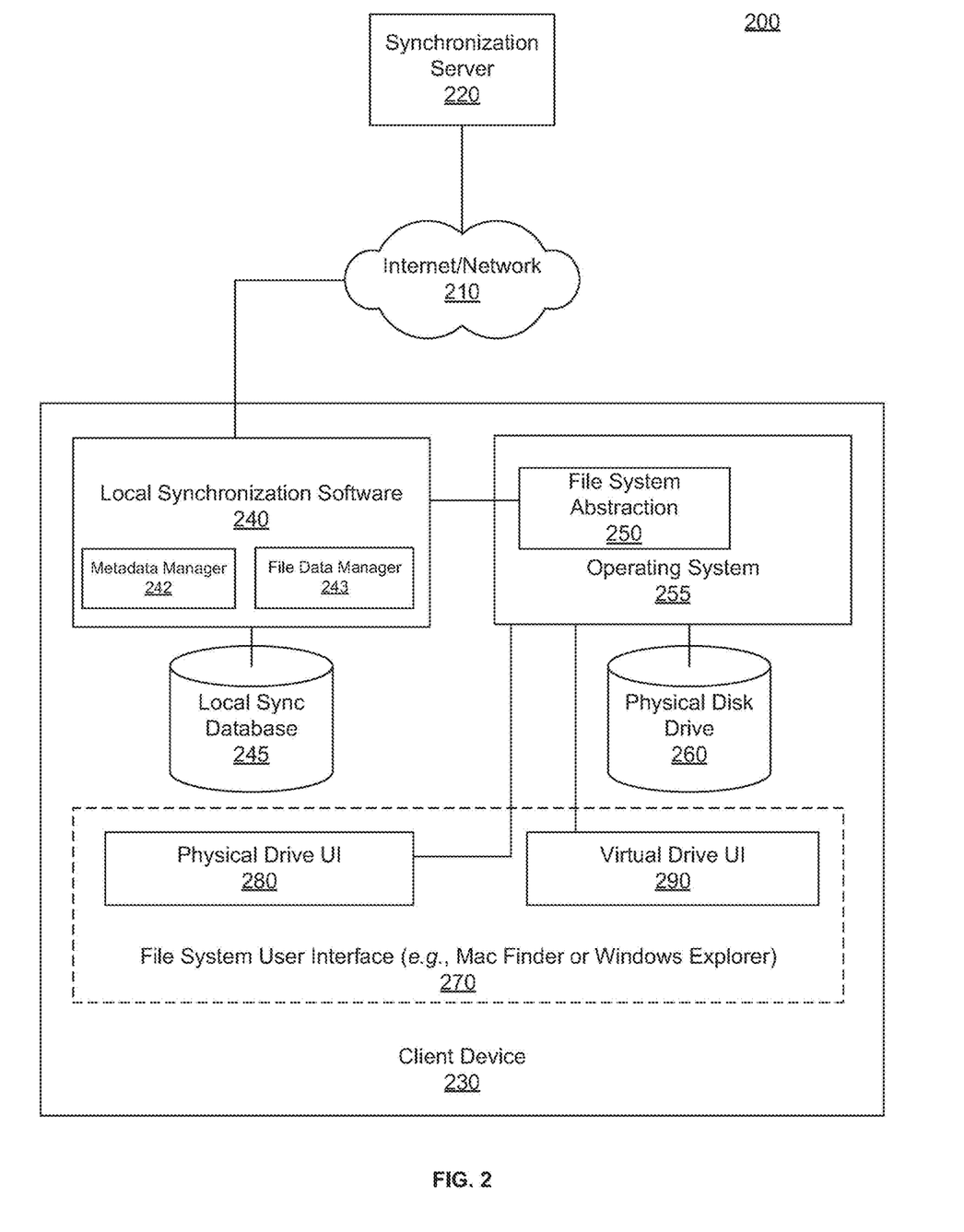
FIG. 2 is a block diagram of a synchronization system according to one embodiment of the invention.

FIG. 2 illustrates an exemplary synchronization system 200 according to one embodiment. As a person skilled in the an would understand, the synchronization system 200 may be constructed in any number of ways within the scope of the present invention. The methods of FIGS. 1a-1d may be implemented in other systems, and the invention is not limited to system 200.

Synchronization system 200 includes a synchronization server (i.e., internet/network) 220, which provides synchronization and back up services to a plurality of end users. For example, all synchronized objects between a user's client devices and between users are stored on server 220 and are accessible from any client device having access to the server 220. Synchronization server 220 is representative of the server-side of a synchronization system and, in a large synchronization system, is likely a plurality of synchronization servers networked together. A person skilled in the art would understand that the synchronization system 200 may have any number of client devices, including one or more desktops, laptops, and mobile devices.

When a synchronization software client in the synchronization system detects a change to a local object, it notifies the synchronization server 220 of the change, and synchronization server 220 then modifies the corresponding object (and/or metadata related to the corresponding object) on the server as applicable. Server 220 notifies the user's other synchronization clients of the change, as well as any clients of other users with access to the changed object. If the content of the object has changed and a synchronization software client has a corresponding copy of the changed object the synchronization software client requests the applicable content data from synchronizations sever 220.

Within client device 230 is local synchronization client software 240, which functions to synchronize client device 230 with the synchronization server 220. The local synchronization software 240 has a metadata manager 242 for receiving and sending change notices to and from synchronizations server 220. The metadata manager stores metadata about objects the user has synchronized or hacked up to server 220 in the local sync database 245. Metadata for objects other users have shared with the user is also Stored in the local sync database 245.

The local synchronization client software 240 includes a file data manager 243 for monitoring synchronized files (via operating system 255) on physical disk drive 260. Physical disk drive 260 stores the user's local files. When a user accesses a remote file via the virtual drive, a copy of such file is temporarily stored on a local physical disk drive 260. The file data manager 243 informs the metadata manager 242 if it detects a change to a synchronized object in physical disk drive 260. The metadata manager 242 then updates the applicable metadata in local sync database 245 and notifies sewer 220 of the change.

The local synchronization software 240 is operatively coupled to a file system abstraction module 250, within operating system 255. The operating system 255 is connected to one or more disk drives 260. The operating system 255 is also connected to a user interface 270 (e.g., MAC FINDER or WINDOWS EXPLORER) which displays the physical drive user interface 280 and the virtual drive user interface 290. The file system abstraction module 250 functions to process and normalize the metadata related to the synchronized objects so that the file system user interface module 270 is able to display the virtual drive 290.

The methods described with respect to FIGS. 1a-1d are embodied in software and performed by a computer system executing the software. A person skilled in the art would understand that a computer system has a memory or other physical, computer-readable storage medium for storing software instructions and one or more processors for executing the software instructions.

Figure 3:
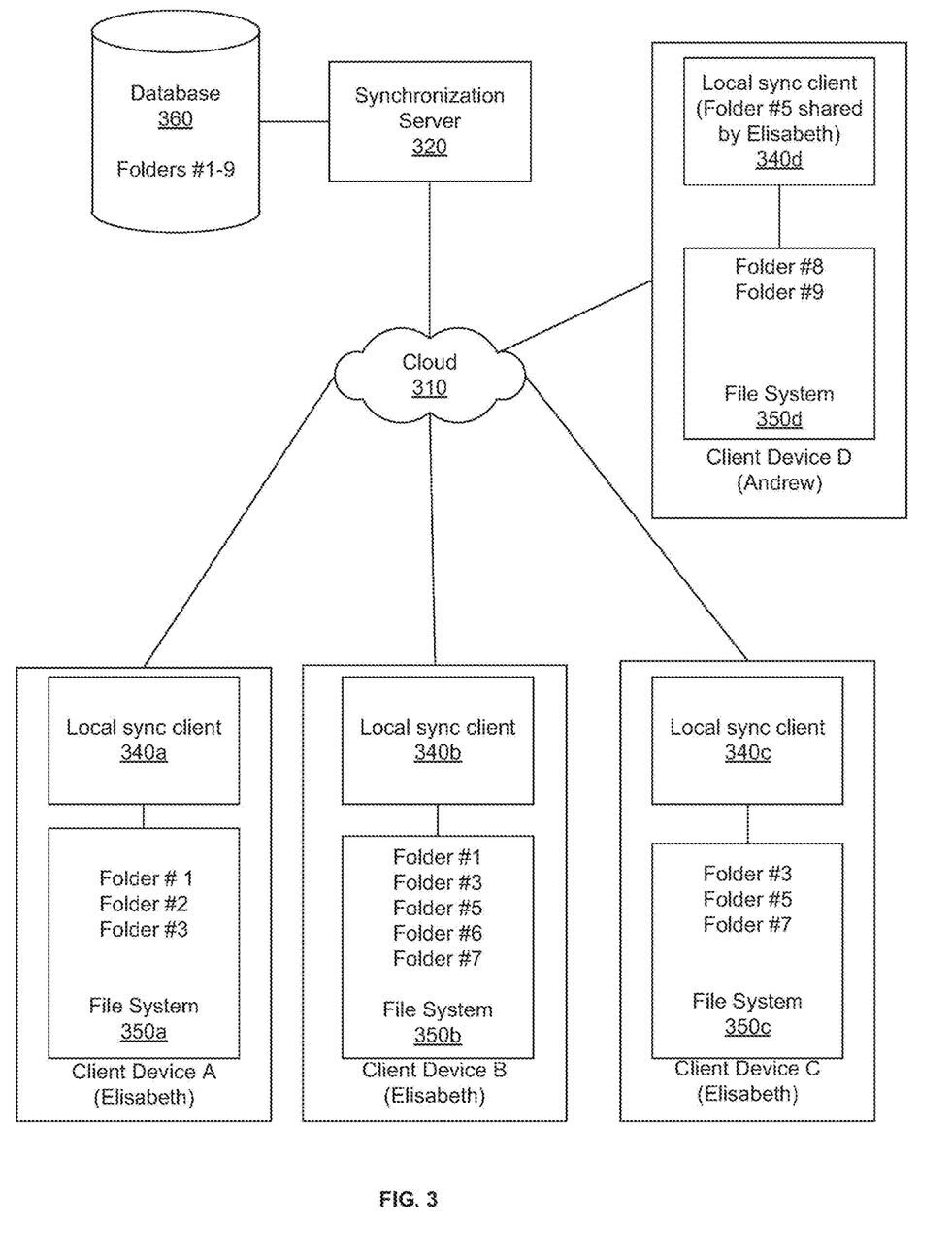
FIG. 3 is a block diagram of a synchronization system according to one embodiment of the invention.
Figure 4A:
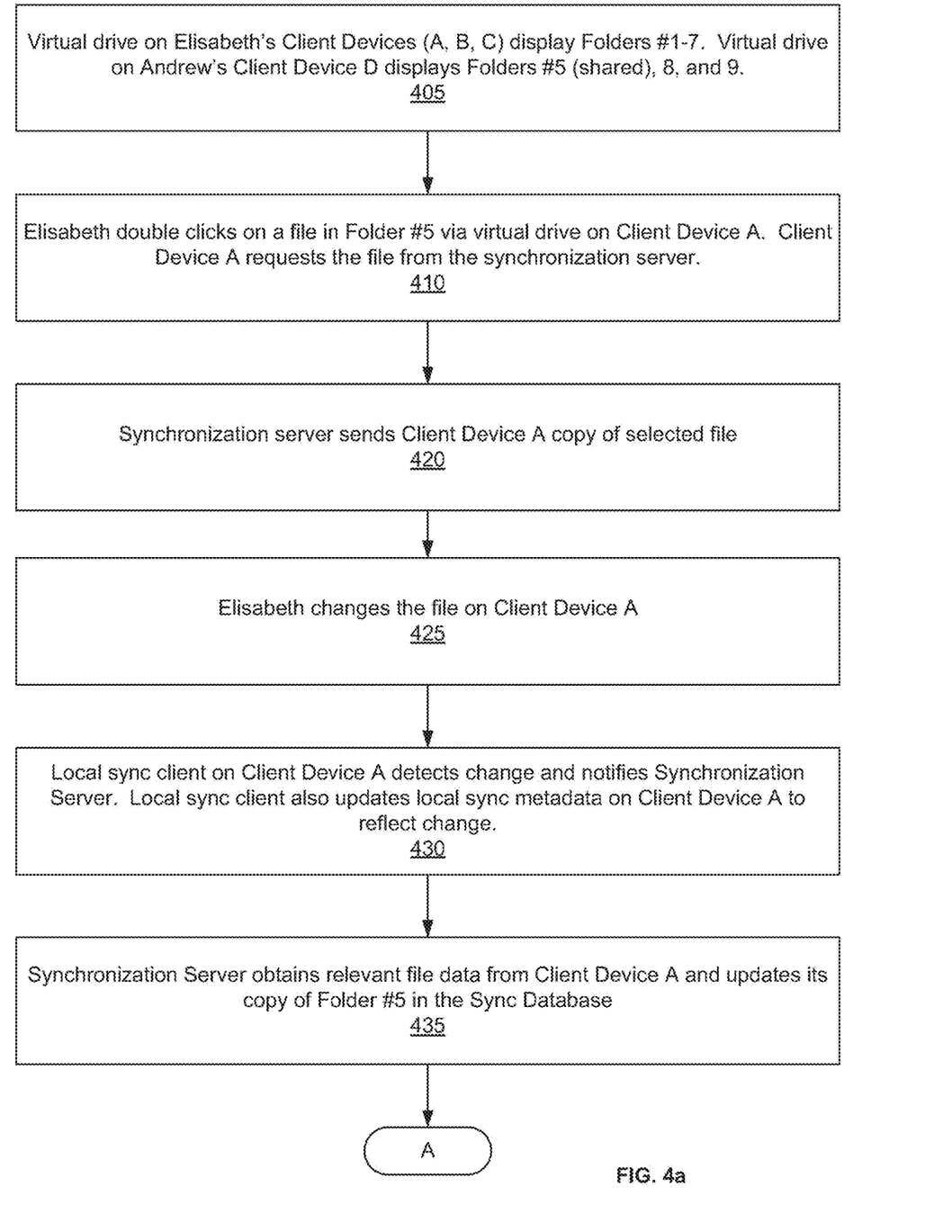
FIGS. 4a-4b are a flowchart that illustrates a method for enabling a user to change a remote folder via the virtual drive according to one embodiment of the invention.
Figure 4B:
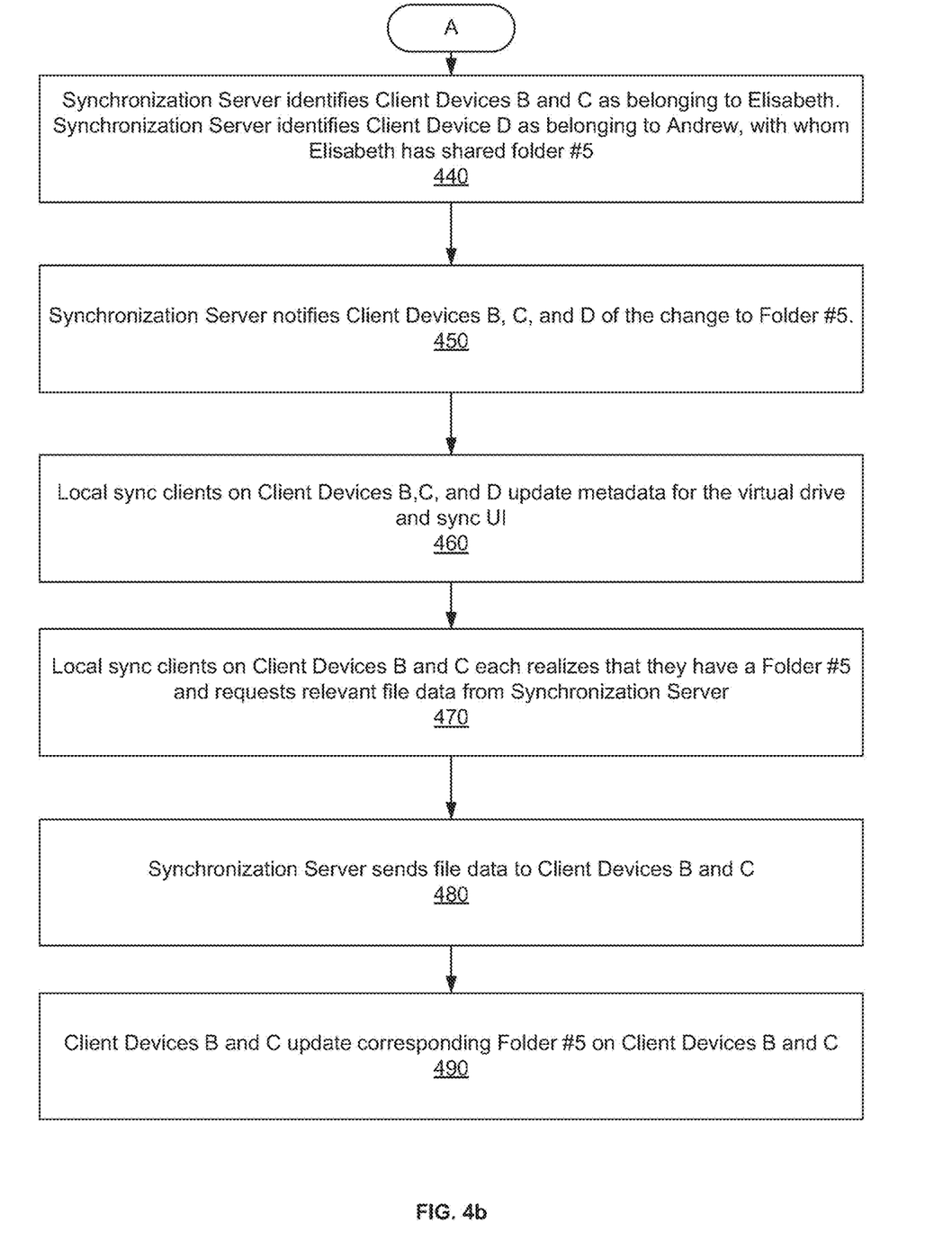

FIGS. 3-4b illustrate a method for enabling a user to change a remote folder via the virtual drive according to one embodiment of the invention. The same method may be applied if a user changes a local folder. In FIG. 3, a synchronization server 320 communicates, via Internet/network 310, to four client devices, Client Device A, Client Device B, Client Device G, and Client Device D. Client Devices A-C belong to a first user (e.g., Elisabeth) and Client Device D belongs to a second user (e.g., Andrew). A person skilled in the art would understand that there may be more or less client devices connected to the cloud 310 within the scope of the present invention.

Each client device has a local synchronization client 340a-340d and a file system 350a-350d. Each file system stores one or more of Folders #1-9 on the local client device For example Client Device A has Folders #1-3 in its file system 350a, Client Device B has Folders #1, 3, and 5-7 in its file system 350b, Client Device C has Folders #3, 5, and 7 in its file system 350c, and Client Device D has Folders #8-9 in its file system 350d. In addition, the first user, Elisabeth, has shared Folder 5 with the second user, Andrew, which appears on the local synchronization client 340d of Client Device D. Database 360 is connected to synchronization server 320 and has ad folders (i.e., Folders #1-9) of all synchronized client devices stored on it.

In FIGS. 4a-4b, the virtual chives on Elisabeth's Client Devices (A, B, C) display Folders #1-7. The virtual drive on Andrew's Client Device D displays Folders #5 (shared), 8, and 9 (step 405). Elisabeth double clicks on a file in Folder #5 via the virtual drive on-Client Device A, and Client Device A requests a copy of the file from the synchronization server 320 (step 410). The synchronization server 320 sends Client Device A a copy of the selected file (step 420). Elisabeth changes the file on Client Device A (step 425). The local synchronization client 340a on Client Device A detects a change and notifies the synchronization server 320. The local synchronization client 340a also updates the local sync metadata on Client Device A to reflect change (step 430). Examples of metadata include file attributes (e.g., permissions, time stamp of last change, file type, file name). The synchronization server 320 obtains the relevant file data from Client Device A and updates its copy of Folder #5 in the Synchronization Database 360 (step 435).

The synchronization server 320 identifies Client Devices B and C as belonging to Elisabeth. Synchronization server 320 identifies Client Device D as belonging to Andrew, with whom Elisabeth has shared Folder #5 (step 440). Synchronization server 320 notifies Client Devices B, C, and D of the change to Folder #3 (step 450). The local synchronization clients 340b, 340c, 340d on Client Devices B, C, and D update the metadata for the virtual drive and synchronization user interface (step 460). The local synchronization clients 340b, 340c, 340d on Client Devices B and C each realizes that they have a Folder #5 and requests relevant file data from synchronization server 320 (step 470). The synchronization server 320 sends file data to Client Devices B and G (step 480). Client Devices B and C update corresponding Folder #5 on Client Devices B and C (step 490).

Figure 5:
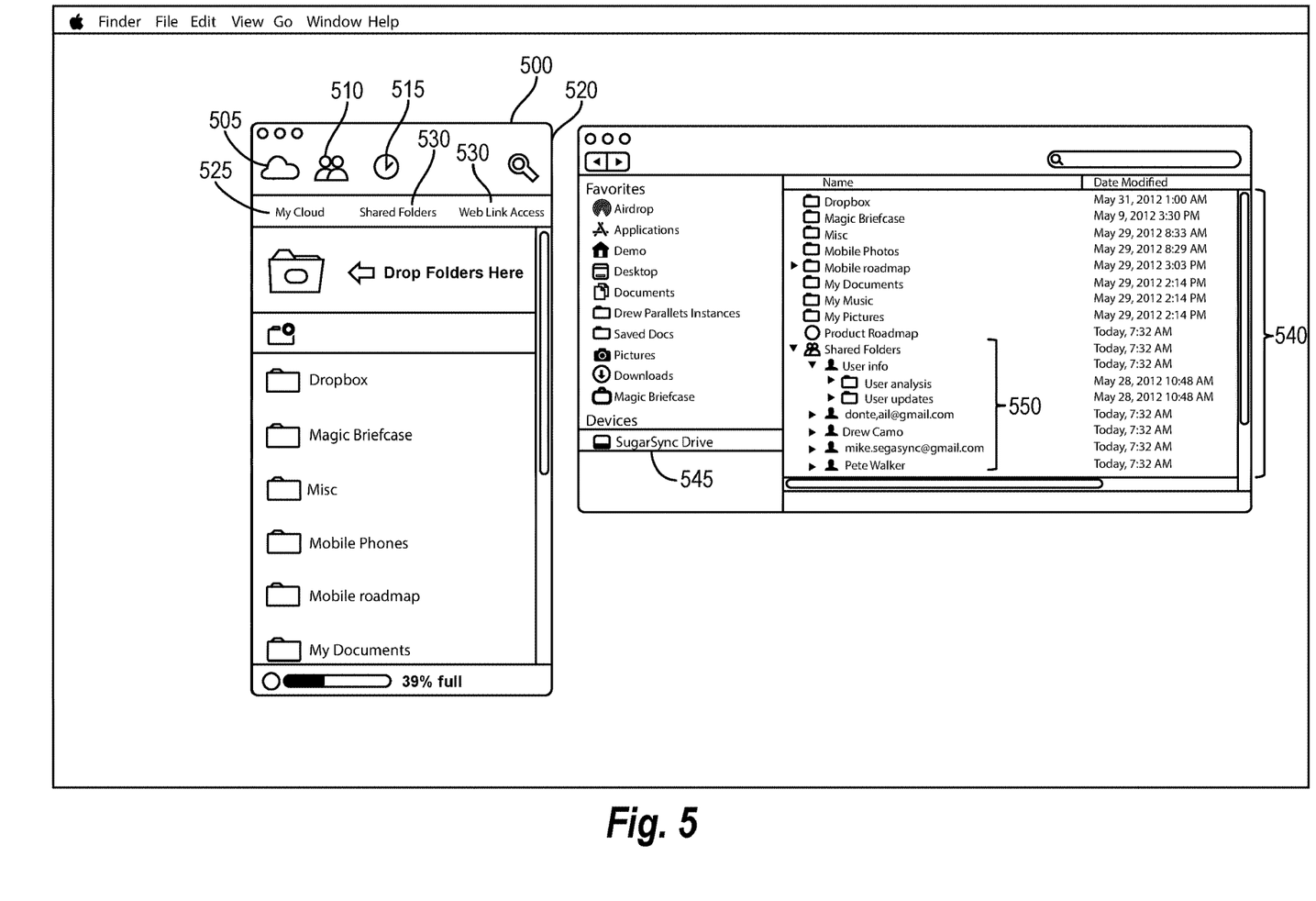
FIGS. 5-6 are screenshots of an exemplary user interface in a synchronization system according to one embodiment of the invention.
Figure 6:
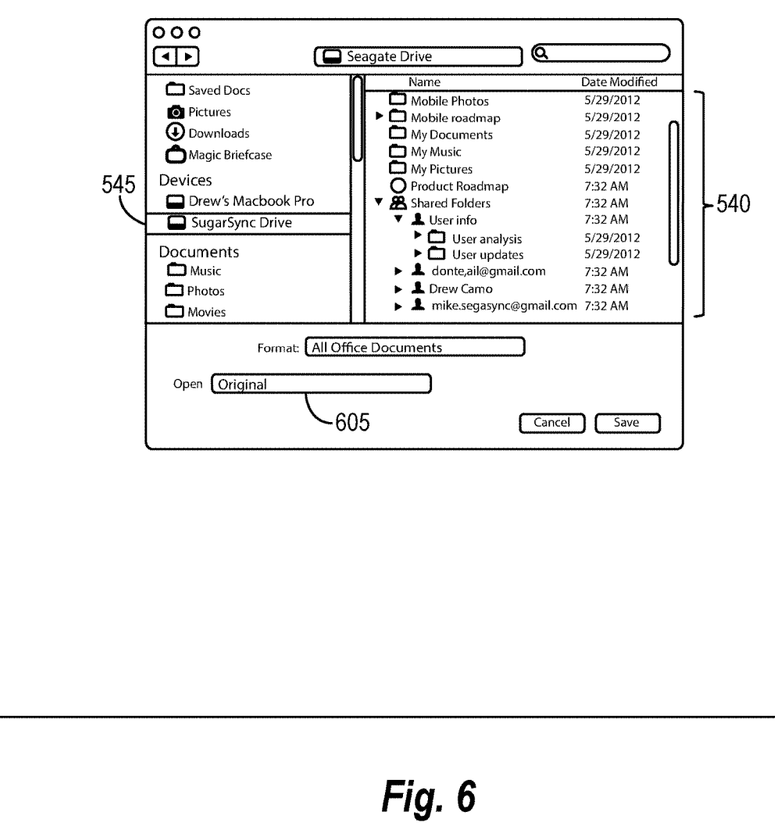

FIGS. 5-6 illustrate screenshots of an exemplary user interface that enables a user to easily synchronize a folder to the synchronization system. A person skilled in the art would understand that the present invention may be embodied on other user interfaces having more or less functionality within the scope of the present invention. As such, FIGS. 5-6 are intended to be illustrative and not limiting in any way.

In FIG. 5, an exemplary user interface 500 for a synchronization system that functions with the virtual drive is provided. The user interface has a content view 505, a sharing view 510, an activity view 515, and a search button 520. The content view 505 has three tabs, a My Cloud tab 525, a Shared folders tab 530, and a Web link tab 535. A more detailed description of an exemplary user interface 500 may be found in U.S. patent application Ser. No. 13/571,564, filed on Aug. 10, 2012, by Andrew Garcia, et al. entitled "System, Method, and Computer Program for Enabling a User to Synchronize, Manage, and Share Folders Across a Plurality of Client Devices and a Synchronization Server," which is incorporated by reference in its entirety.

FIG. 5 also illustrates a virtual drive on an exemplary file system user interface, such as the MAC FINDER on a MACINTOSH-based computer. The virtual drive may also be embodied on a WINDOWS-based computer, such as using WINDOWS EXPLORER. Folders 540 include folders, across the synchronization, software clients of the user's client devices, that (i) the user has synchronized or backed up in the synchronization system, (ii) have been shared with the user, or (iii) the user has shared with other users. Any file in folders 540 may be accessed through the virtual drive 545, including files in folders located only on a remote synchronization software client or synchronization server 220. That means that the folders 540 may be viewed as if they resided on the hard drive of the local client device and the user may add, edit, delete, and move files within the folders 540, which would result in the tiles being added, edited, deleted, or moved in corresponding folders on remote synchronization software clients and the synchronization sewer. Not only are all of the user's folders, which have been synchronized, accessible through the virtual drive, but all of the folders 550 shared, with the user by other users.

FIG. 6 illustrates how a file may be opened via the virtual drive 545. The user can choose a file from any folder 540 in the virtual drive 545. The user may choose whether to open the original or a copy 605. After the user modifies and saves the document, any changes arc uploaded to the synchronization server 220 and a copy of the changed metadata is pushed to all synchronization software clients that have registered for notices of changes to the folder.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method comprising:
storing, on a user client device, metadata comprising information indicating folders and contents of the folders that are stored remote from the user client device and that the user client device can access, wherein the folders and the contents of the folders are synchronized to a synchronization server;
displaying, on the user client device and based on the metadata, a plurality of graphical indicators representing the folders and the contents of the folders, the plurality of graphical indicators comprising:
a first folder indicator representing first folder content, the first folder content located on the synchronization server and not located on the user client device, and
a second folder indicator, separate from the first folder indicator, representing second folder content located on the user client device, wherein the first folder indicator and the second folder indicator are displayed in the same manner such that the first folder content located on the synchronization server visually appears to be locally stored on the user client device;
receiving, at the user client device, an indication of a user interaction with the first folder indicator;
providing, based on the indication of the user interaction with the first folder indicator, an option to set permission attributes associated with the first folder content;
receiving, at the user client device, a permission attribute associated with the first folder content; and
sending, to the synchronization server, a notification comprising updated metadata indicating the received permission attribute associated with the first folder content.

2. The method of claim 1, wherein sending, to the synchronization server, the notification indicating the received permission attribute causes the synchronization server to update the permission attribute for the first folder content on at least one additional client device with which the first folder content is synchronized.

3. The method of claim 1, wherein the received permission attribute for the first folder content defines a sharing permission for the first folder content.

4. The method of claim 1, wherein the received permission attribute for the first folder content defines an editing permission for the first folder content.

5. The method of claim 1, further comprising downloading, from the synchronization server, the first folder content to the user client device upon receiving input to access the first folder content via an application on the user client device.

6. The method of claim 1, wherein the received permission attribute for the first folder content defines a synchronization setting for the first folder content.

7. A system comprising:
at least one processor; and
a non-transitory computer readable medium comprising instructions that, when executed by the at least one processor, cause the system to:
   store, on a user client device, metadata comprising information indicating folders and contents of the folders that are stored remote from the user client device and that the user client device can access, wherein the folders and the contents of the folders are synchronized to synchronization server;
   display, on the user client device and based on the metadata, a plurality of graphical indicators representing the folders and the contents of the folders, the plurality of graphical indicators comprising:
      a first folder indicator representing first folder content, the first folder content located on the synchronization server and not located on the user client device, and
      a second folder indicator, separate from the first folder indicator, representing second folder content located on the user client device, wherein the first folder indicator and the second folder indicator are displayed in the same manner such that the first folder content located on the synchronization server visually appears to be locally stored on the user client device;
   receive, at the user client device, an indication of a user interaction with the first folder indicator;
   provide, based on the indication of the user interaction with the first folder indicator, an option to set permission attributes associated with the first folder content;
   receive, at the user client device, a permission attribute associated with the first folder content; and
   send, to the synchronization server, a notification comprising updated metadata indicating the received permission attribute associated with the first folder content.

8. The system of claim 7, wherein sending, to the synchronization server, the notification indicating the received permission attribute causes the synchronization server to update the permission attribute for the first folder content on at least one additional client device with which the first folder content is synchronized.

9. The system of claim 7, wherein the received permission attribute for the first folder content defines a sharing permission for the first folder content.

10. The system of claim 7, wherein the received permission attribute for the first folder content defines an editing permission for the first folder content.

11. The system of claim 7, further comprising instructions that, when executed by the at least one processor, cause the system to download, from the synchronization server, the first folder content to the user client device upon receiving input to access the first folder content via an application on the user client device.

12. The system of claim 7, wherein the received permission attribute for the first folder content defines a synchronization setting for the first folder content.

13. A non-transitory computer-readable medium comprising instructions that, when executed by at least one processor, cause a user client device to:
   store metadata comprising information indicating folders and contents of the folders that are stored remote from the user client device and that the user client device can access, wherein the folders and the contents of the folders are synchronized to synchronization server;
   display, based on the metadata, a plurality of graphical indicators representing the folders and the contents of the folders, the plurality of graphical indicators comprising:
      a first folder indicator representing first folder content, the first folder content located on the synchronization server and not located on the user client device, and
      a second folder indicator, separate from the first folder indicator, representing second folder content located on the user client device, wherein the first folder indicator and the second folder indicator are displayed in the same manner such that the first folder content located on the synchronization server visually appears to be locally stored on the user client device;
   receive, at the user client device, an indication of a user interaction with the first folder indicator;
   provide, based on the indication of the user interaction with the first folder indicator, an option to set permission attributes associated with the first folder content;
   receive, at the user client device, a permission attribute associated with the first folder content; and
   send, to the synchronization server, a notification comprising updated metadata indicating the received permission attribute associated with the first folder content.

14. The non-transitory computer-readable medium of claim 13, wherein sending, to the synchronization server, the notification indicating the received permission attribute causes the synchronization server to update the permission attribute for the first folder content on at least one additional client device with which the first folder content is synchronized.

15. The non-transitory computer-readable medium of claim 13, the received permission attribute for the first folder content defines a sharing permission for the first folder content.

16. The non-transitory computer-readable medium of claim 13, wherein the received permission attribute for the first folder content defines an editing permission for the first folder content.

17. The non-transitory computer-readable medium of claim 13, further comprising instructions that, when executed by the at least one processor, cause the user client device to download, from the synchronization server, the first folder content upon receiving input to access the first folder content via an application on the user client device.

18. The non-transitory computer-readable medium of claim 13, wherein the received permission attribute for the first folder content defines a synchronization setting for the first folder content.

19. A non-transitory computer-readable medium comprising instructions that, when executed by at least one processor, cause a user client device to:
   store metadata comprising information indicating items that are stored remote from the user client device and that the user client device can access, wherein the items are synchronized to synchronization server;
   display, based on the metadata, a plurality of graphical indicators representing the items, the plurality of graphical indicators comprising:
      a first item indicator representing first item content, the first item content located on the synchronization server and not located on the user client device, and
      a second item indicator, separate from the first item indicator, representing second item content located on the user client device, wherein the first item indicator and the second item indicator are displayed in the same manner such that the first item content located on the synchronization server visually appears to be locally stored on the user client device;

provide, based on an indication of a user interaction with the first item indicator, an option to set permission attributes associated with the first item content;

receive a permission attribute associated with the first item content; and send, to the synchronization server, a notification comprising updated metadata indicating the edit to the permission attribute associated with the first item content.

20. The non-transitory computer-readable medium of claim 19, wherein sending, to the synchronization server, the notification indicating the received permission attribute causes the synchronization server to update the permission attribute for the first folder content on at least one additional client device with which the first folder content is synchronized.

21. The non-transitory computer-readable medium of claim 19, wherein the received permission attribute for the first item content defines a sharing permission for the first item content.

22. The non-transitory computer-readable medium of claim 19, wherein the received permission attribute for the first item content defines an editing permission for the first folder content.

23. The non-transitory computer-readable medium of claim 19, further comprising instructions that, when executed by the at least one processor, cause the user client device to download, from the synchronization server, the first item upon receiving input to access the first item via an application on the user client device.

24. The non-transitory computer-readable medium of claim 19, wherein the received permission attribute for the first item content defines a synchronization setting for the first item content.

* * * * *

UNITED STATES PATENT AND TRADEMARK OFFICE
CERTIFICATE OF CORRECTION

PATENT NO. : 10,805,388 B2
APPLICATION NO. : 14/873004
DATED : October 13, 2020
INVENTOR(S) : Rashid et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 226 days.

Signed and Sealed this
Thirty-first Day of January, 2023

Katherine Kelly Vidal
*Director of the United States Patent and Trademark Office*